United States Patent [19]

Stewart et al.

[11] Patent Number: 5,408,826
[45] Date of Patent: Apr. 25, 1995

[54] GAS TURBINE ENGINE CASING CONSTRUCTION

[75] Inventors: Ian F. Stewart; Sivasubramaniam K. Sathianathan; David J. Chisholm, all of Derby, England

[73] Assignee: Rolls-Royce plc, London, England

[21] Appl. No.: 216,838

[22] Filed: Mar. 24, 1994

[30] Foreign Application Priority Data

Apr. 7, 1993 [GB] United Kingdom ............. 9307288

[51] Int. Cl.6 .............................................. F02K 3/02
[52] U.S. Cl. .................................. 60/226.1; 60/909; 415/9
[58] Field of Search ............. 60/226.1, 39.091, 909; 415/9, 197

[56] References Cited

U.S. PATENT DOCUMENTS

| | | |
|---|---|---|
| 4,397,608 | 8/1983 | Husain et al. |
| 4,425,080 | 1/1984 | Stanton et al. ............ 605/226.1 |
| 4,490,092 | 12/1984 | Premont ...................... 415/9 |
| 4,500,252 | 2/1985 | Monhardt et al. |
| 4,534,698 | 8/1985 | Tomich ........................ 415/9 |
| 4,699,567 | 10/1987 | Stewart ....................... 415/9 |
| 4,725,334 | 2/1988 | Brimm ......................... 415/9 |
| 4,818,176 | 4/1989 | Huether et al. ............... 415/9 |
| 4,902,201 | 2/1990 | Neubert ....................... 415/197 |
| 5,273,393 | 12/1993 | Jones et al. .................. 415/9 |

FOREIGN PATENT DOCUMENTS

| | | | |
|---|---|---|---|
| 2581400 | 11/1986 | France. | |
| 2037900 | 7/1980 | United Kingdom ........... | 415/9 |
| 2159886 | 11/1985 | United Kingdom. | |

Primary Examiner—Timothy S. Thorpe
Attorney, Agent, or Firm—Cushman, Darby & Cushman

[57] ABSTRACT

A casing assembly for a ducted fan gas turbine engine comprises a casing around which extend two annular, axially spaced apart, frangible rails. Pieces of cloth woven from an aromatic polyamide fibre are positioned on the casing radially outer surface between the rails. Continuous layers of the cloth are wound around the casing radially outwardly of the rails and cloth pieces. The arrangement provided enhanced containment of any fan blades of the engine which may become detached from the gas turbine engine which carries the casing assembly.

11 Claims, 2 Drawing Sheets

GAS TURBINE ENGINE CASING CONSTRUCTION

FIELD OF THE INVENTION

This invention relates to a gas turbine engine casing construction and is particularly concerned with the construction of the fan casing of a ducted fan gas turbine engine.

BACKGROUND OF THE INVENTION

Ducted fan gas turbine engines for powering aircraft conventionally comprise a core engine which drives a propulsive fan. The fan, in turn, comprises a number of radially extending aerofoil blades mounted on a common hub and enclosed within a generally cylindrical casing.

There is a remote possibility with such engines that part or all of one or more of the fan blades could become detached from the remainder of the fan. This might be as the result of, for instance, the engine ingesting a large foreign body such as a bird. In the event of this happening, it is extremely important that the detached blade or blade portion is contained by the fan casing. Thus the fan casing must be sufficiently strong to ensure that the detached blade or blade portion does not pass through the casing and cause damage to the aircraft carrying the engine.

There are various ways in which the problem of fan blade containment may be tackled. The most obvious way is to manufacture the fan casing from an alloy which is sufficiently strong and thick to provide the desired degree of containment. However this almost invariably results in a fan casing which is undesirably heavy. An alternative approach is to provide an alloy fan casing which is thin, and therefore light, and wind around it a strong fibrous material such as an aromatic polyamide. In the event of all or part of a fan blade becoming detached, it passes through the thin alloy casing but is contained by the fibrous material.

There is a danger that the detached fan blade or blade part could cut through part of the fibre wrap, thereby reducing its ability to provide effective containment. This problem is addressed in GB2159886B by the provision of patches of the fibrous material interposed between the wound fibrous material and the casing. In the event that a fan blade or blade portion becomes detached, it pierces and passes through the casing to engage some of the patches. The patches wrap around the leading regions of the fan blade or blade portion to define a pad which in turn protects the wound fibrous material from being cut by those leading regions.

It is important for the effective operation of fan blade containment systems of this kind that the patches of fibrous material are minimally constrained. However this can be difficult to achieve since they can be compressed by the wound fibrous material which surrounds them. However if they are not tightly held by the wound material, there is a danger that they could slip into undesirable positions. Moreover any slackness in the wound material could compromise its effectiveness in providing fan blade containment.

There is a further difficulty with such fan casing constructions in that, in the interest of lightness, the alloy part of the fan casing is made as thin as possible. This can lead to a lack of adjacent stiffness in the casing. The problem is particularly severe in the case of the more powerful ducted fan engines which have very large diameter fan casings. Any thickening of the casings to provide the necessary degree stiffness is likely to increase the weight of the casings to undesirable levels.

SUMMARY OF THE INVENTION

It is an object of the present invention to provide a gas turbine engine casing construction which substantially avoids these difficulties.

According to the present invention, a gas turbine engine casing assembly comprises an annular cross-section casing configured to surround an annular array of rotary aerofoil blades, said casing defining a radially outer surface and having at least two annular, axially spaced apart, rail members on said radially outer surface and positioned coaxially therewith, discrete pieces of flexible containment material located as discontinuous layers on said casing radially outer surface between and by said rail members, and a plurality of layers of flexible containment material wound as continuous lengths around said casing radially outwardly of said rail members and of said discrete pieces.

BRIEF DESCRIPTION OF THE DRAWINGS

The present invention will now be described by way of example, with reference to the accompanying drawings in which.

DETAILED DESCRIPTION OF THE INVENTION

Figure 1:
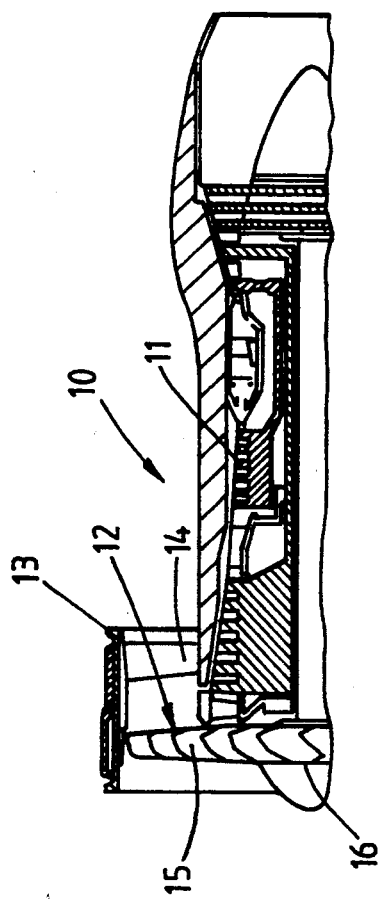
FIG. 1 is a schematic sectioned side view of the upper half of a ducted fan gas turbine engine having a casing in accordance with the present invention.

With reference to FIG. 1, a ducted fan gas turbine engine shown at 10 is of generally conventional configuration. It comprises a core engine 11 which drives a propulsive fan 12 enclosed within a fan casing assembly 13. The exhaust from the fan 12 is divided into two flows. The first and largest flow is directed to the exterior of the engine 10 over an annular array of outlet guide vanes 14 located at the downstream end of the fan casing assembly 13. The outlet guide vanes 14 are generally radially extending and interconnect the fan casing assembly 13 with the core engine 11. The remainder of the air flow from the fan 12 is directed into the core engine 11 where it is compressed and mixed with fuel before being combusted to drive the core engine 11 by conventional turbines.

The fan 12 comprises an annular array of radially extending aerofoil cross-section blades 15 mounted on a common hub 16. During the operation of the ducted fan gas turbine engine 10, the core engine 11 drives the fan 12 at high speed. There is a remote chance that as a result of mechanical failure, all or part of one or more of the fan blades 15 could become detached from the remainder of the fan 12. Such mechanical failure could arise, for instance, as the result of a foreign body, such as a large bird, impacting the fan 12. The high rotational speed of the fan 12 ensures that any such detached fan blade 15 or fan blade 15 portion is flung radially outwardly with great force towards the fan casing assembly 13.

It is vitally important from a safety point of view that the detached fan blade 15 or fan blade 15 portion should be Contained by the fan casing assembly 13. Thus it should not pass through the fan casing assembly 13 and cause damage to the aircraft upon which the engine 10 is mounted.

The fan casing assembly 13 is of a unique construction which ensures that any such detached fan blade 15 or fan blade 15 portion is contained by the casing assembly 13. The construction of the casing assembly 13 can be seen more clearly if reference is now made to FIG. 2.

Figure 2:
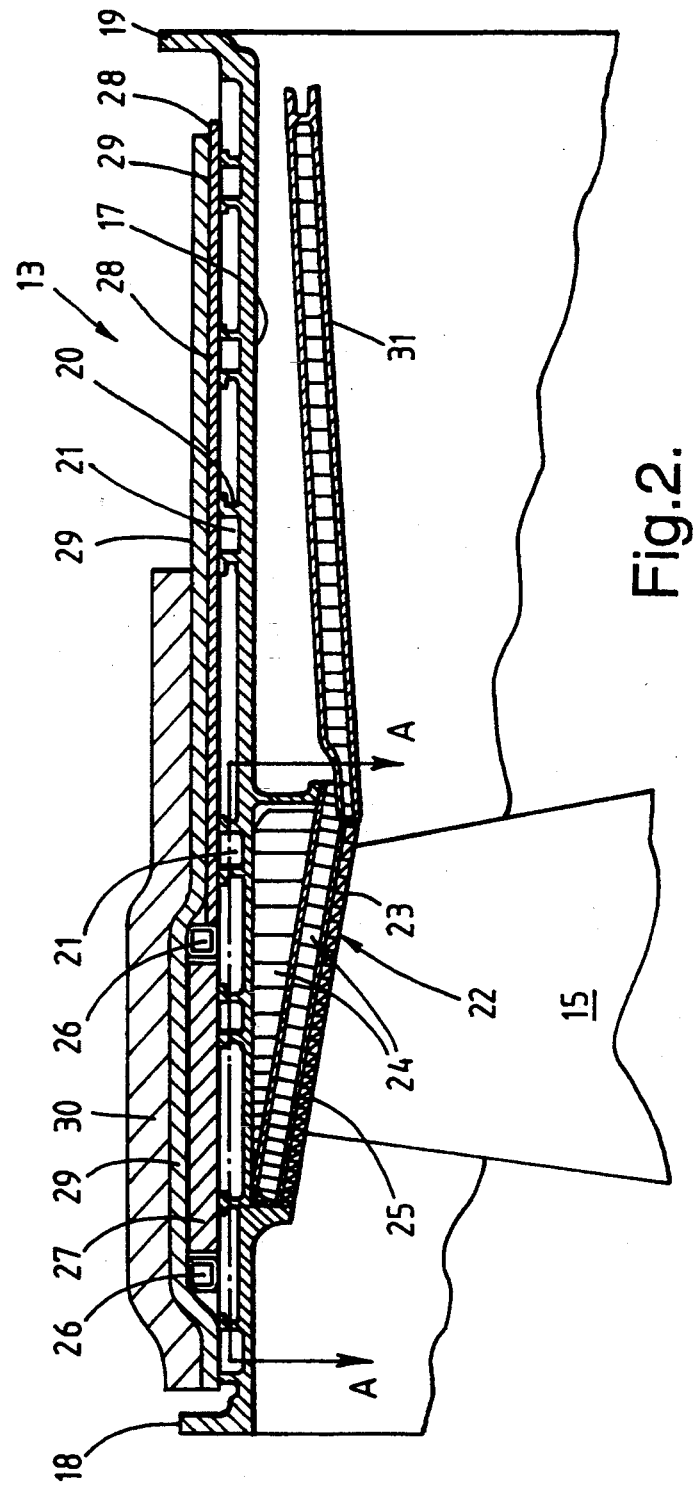
FIG. 2 is a sectioned side view of part of the fan casing of the ducted fan gas turbine engine shown in FIG. 1.

The fan casing assembly 13 comprises an annular cross-section casing 17 which is supported from the core engine 11 by means of the outlet guide vanes 14 (omitted from FIG. 2 in the interests of clarity). Flanges 18 and 19 are respectively provided at the upstream and downstream ends of the casing 17 to facilitate attachment of the casing to the engine intake and outlet guide vanes (not shown) and to provide stiffening of the casing.

Figure 4:
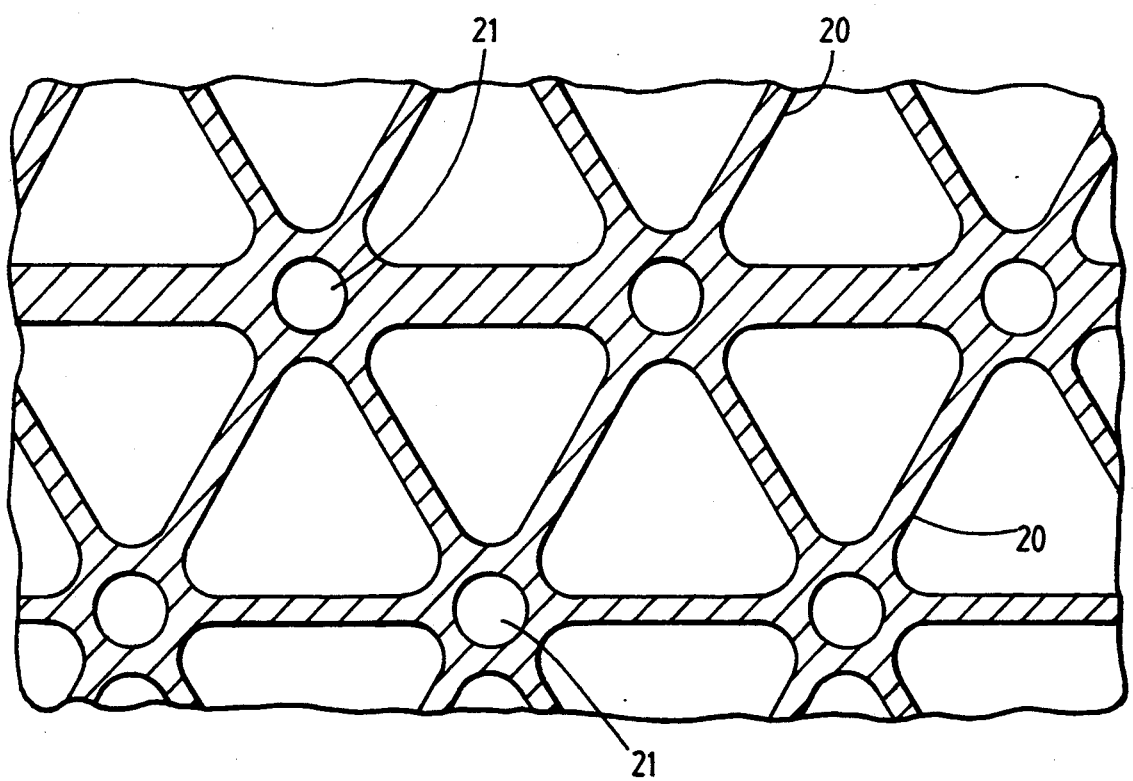
FIG. 4 is a view on section line A—A of FIG. 2.

It is important that the casing 17 is as stiff as possible in order to avoid its distortion under load, but also as thin as possible in order to minimise its weight. To this end, the radially outer surface of the casing 17 is provided with integral stiffening ribs 20 as can be seen in FIG. 4. The ribs 20 are distributed over virtually the whole of the radially outer surface of the casing 17. Additionally they are interconnected so that they define a triangular pattern as is readily apparent from FIG. 4. Blind radial holes 21 are provided at the points of intersection of the stiffening ribs to provide still further weight reduction.

The radially inner surface of the fan casing 17 supports an annular liner 22 which surrounds the radially outer extents of the fan blades 15. The liner 22 protrudes a significant distance radially inwardly so that it terminates immediately adjacent the radially outer tips 23 of the fan blades 15. The liner 22 also supports an annular flow defining structure 31. The majority 0f the liner 22 is formed from a metallic honeycomb material 24, part of which is axially inclined to follow the profile of the fan blade tips 23. The radially inner surface of the liner 22 is, however, provided with a coating 25 of a suitable abradable material. As the fan blades 15 rotate during normal engine operation, their tips 23 cut a path through the abradable coating 25. This ensures that the radial clearance between the liner 22 and the fan blade tips 23 is as small as possible, thereby minimizing efficiency damaging air leakage across the blade tips 23.

As well as minimizing air leakage across the blade tips 23, the liner 22 performs two further important functions. Firstly, it assists in the stiffening of the fan casing 17. Clearly any lack of stiffeners in the fan casing 17 could result in flexing of the liner 22 and hence changes in the clearance between the liner 22 and the fan blade tips 23.

Secondly, in the event that the whole or part of one of the fan blades 15 should become detached, the honeycomb construction of the liner 22 defines a region which the detached fan blade 15 or fan blade 15 portion can move into. This tends to minimize the possibly damaging interaction between the detached fan blade 15 or fan blade 15 portion and the remaining fan blades 15. It also ensures that distortion of the fan casing 17, which will inevitably occur when the detached fan blade 15 or fan blade 15 portion impacts it, will reduce the effects of the fan casing 17 coming into contact with the remaining fan blades 15 and thereby causing additional engine damage.

The fan casing 17 is of such a thickness that in the event of a detached fan blade 15 or fan blade 15 portion coming into contact with it, it is pierced. Thus although the fan casing 17 alone is not capable of containing a detached fan blade 15 or fan blade 15 portion, it does absorb some of the kinetic energy of that blade 15.

Figure 3:
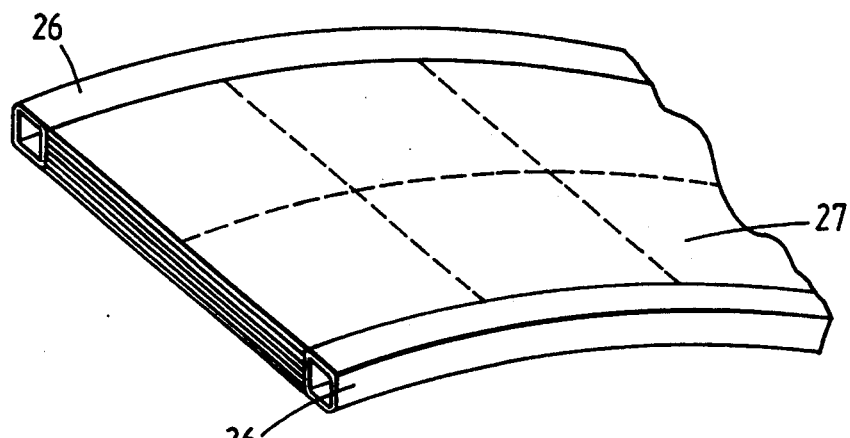
FIG. 3 is a perspective view of a portion of the fan casing shown in FIG. 2.

Containment of a detached fan blade 15 or fan blade 15 portion is provided by containment material which is provided around the radially outer surface of the fan casing 17. More specifically, the portion of the radially outer surface of the fan casing 17 which is radially outwardly of the fan blade tips 23, and slightly upstream thereof, is provided with two annular axially spaced apart frangible rail members 26. The rail members 26, which can also be seen in FIG. 3, are hollow and of generally rectangular cross-sectional configuration. They are attached to the fan casing 17 by brazing or other suitable method and are coaxial with the fan casing 17, thereby providing additional stiffening of the casing 17.

The axial space between the rails 26 is filled with discrete pieces of flexible containment material 27 woven from the aromatic polyamide fibres known as "Kevlar" ("Kevlar" is a registered trade mark of Du-Pont Ltd). The pieces 27, which are approximately 150 mm square, are loosely held together by a small number of cotton stitches 27a. The cotton stitches 27a serve to hold the pieces 27 together as they are wound on to the fan casing 17 between the rails 26. Thus there are several, functionally discontinuous layers of the pieces 27 between the rails 26; the rails 26 serving to axially locate the pieces 27.

A first continuous length 28 of woven "Kevlar" fibre is wound around the fan casing 17 between the most downstream of the rails 26 and a region upstream of the fan casing flange 19.

A second continuous length 29 of woven "Kevlar" fibre is wound around the rails 26, the pieces 27 and the first continuous length 28. Finally a third continuous length 30 of woven "Kevlar" fibre is wound around the upstream half of the second continuous length 29. The third continuous length 30 is wound around the fan casing 17 a greater number of times than the remaining lengths 28 and 29 so that it is of the greatest radial thickness.

The rails 26 ensure that the second continuous length 29 does not exert any loads on to the pieces 27 which could put those pieces 27 into compression. It is important for the effective operation of the present invention that pieces 27 are as loose as possible.

The first continuous length 28 wound directly onto the rearward portion of the fan casing 17 serves several purposes. Firstly, it ensures that the tension in the second continuous length 29 is increased in its downstream regions. Secondly it thereby provides a reduction in the peak tensions in the second continuous length 29 as it passes over the rails 26. Finally it provides additional blade containment which will be referred to in more detail later in the specification.

In the event that a fan blade 15 or fan blade 15 portion becomes detached from the fan 12, it pierces the liner 22 and the fan casing 17 before encountering the pieces 27. The pieces 27 which are impacted by the detached fan blade 15 or fan blade 15 portion effectively "blunt" the sharp edges on the blade 15 by wrapping themselves around those edges. For this to occur successfully, it is important that each of the pieces 27 is effectively independent of its neighbouring pieces 27 and has as little inertia as possible. This is achieved by the use of the easily broken cotton threads 27a interconnecting the woven pieces 27 and the protection afforded to the pieces 27 by the rails 26 from the constraining effect of the second continuous fibre length 29.

The detached fan blade 15 or fan blade 15 portion then encounters the second and third continuous fibre lengths 29 and 30. Since the sharp edges on the detached blade 15 are by now protected by the pieces 27, there is little likelihood that any of the continuous fibre lengths 29 and 30 will be severed by those sharp edges. Instead, the fibre lengths 29 and 30 serve to contain the detached fan blade 15 or fan blade 15 portion. This is achieved by a combination of elongation and deformation of the fibres in the second and third continuous lengths 29 and 30 and the friction between adjacent fibre layers. The second and third continuous lengths 29 and 30 thus provide containment of the detached fan blade 15 or fan blade 15 portion.

Since the rails 26 are frangible, they break up when impacted by a detached fan blade 15 or fan blade 15 portion. Consequently they do not detrimentally affect the effective blade containment provided by the second and third lengths 29 and 30. Moreover they serve to absorb some of the kinetic energy of the detached fan blade 15 or fan blade 15 portion. It will be appreciated however that although it is desirable that the rails 26 are frangible, it is not essential that they are.

There is a possibility that a detached fan blade 15 could cause additional damage to the downstream regions of the fan casing 17. For instance, while the major portion of a detached fan blade 15 will impact the casing 17 region in the vicinity of the rails 26, its radially inward or root region could impact the downstream regions of the fan casing 17. This would result in the casing 17 being pierced in this region. However the first continuous length 28 ensures that the fan blade 15 is effectively contained. It does this because although the second and third continuous lengths 29 and 30 will have been deflected by the main detached fan blade 15 impact at this point, the first continuous length 28 will not have been. By effectively containing part of the detached fan blade 15 in this manner, potentially damaging deflections of the detached fan blade 15 within the fan casing 17 are avoided, thereby limiting overall engine damage.

Although the present invention has been described with reference to the use of woven aromatic polyamide fibres for use in containment, other suitable materials may be employed if so desired. Essentially all that is necessary is that the containment material should be sufficiently strong and flexible.

Moreover, although the present invention has been described with reference to the containment of detached fan blades 15 and fan blade 15 portions, it could be applied to other parts of a gas turbine engine where there is a requirement that detached rotary parts are effectively contained.

We claim:

1. A gas turbine engine casing assembly comprising an annular cross-section casing configured to surround an annular array or rotary aerofoil blades, said casing defining a radially outer surface and having at least two annular, axially spaced apart, rail members on said radially outer surface and positioned coaxially therewith discrete pieces of flexible containment material located as discontinuous layers on said casing radially outer surface between, and by, said rail members, and a plurality of layers of flexible containment material wound as continuous lengths around said casing radially outwardly of said rail members and said discrete pieces, said rail members and said discrete pieces being completely covered by said plurality of layers, said plurality of layers being noncoextensive relative to each other.

2. A gas turbine engine casing assembly as claimed in claim 1 wherein said casing assembly is a fan casing assembly.

3. A gas turbine engine casing assembly as claimed in claim 2 wherein said plurality of layers of flexible containment material wound as continuous lengths around said casing radially outwardly of said rail members and said discrete pieces comprises two continuous extents of said material, the first of said extents being positioned radially inwardly of the second of said extents, said first extent being of greater axial extent than said second extent to extend downstream of said rails.

4. A gas turbine engine casing assembly as claimed in claim 3 wherein a third continuous extent of said flexible containment material is wound around said casing, said third continuous extent being wound around the portion of said casing downstream of said rail members radially inwardly of said second continuous extent.

5. A gas turbine engine casing assembly as claimed in claim 1 wherein said discrete pieces of flexible containment material are loosely stitched together with readily frangible threads.

6. A gas turbine engine casing assembly as claimed claim 5 wherein said readily frangible threads are of cotton.

7. A gas turbine engine casing assembly as claimed claim 1 wherein said flexible containment material comprises fabric woven from aromatic polyamide fibres.

8. A gas turbine engine casing assembly as claimed in claim 1 wherein said casing is provided on its radially outer surface with a network of integral reinforcing ribs.

9. A gas turbine engine casing assembly as claimed in claim 8 wherein said integral reinforcing ribs are in the form of inter-connected triangles.

10. A gas turbine engine casing assembly as claimed in claim 1 wherein rail members are frangible.

11. A gas turbine engine casing assembly as claimed in claim 10 wherein said frangible rail members are in the form of hollow, rectangular cross-section tubes.

* * * * *